United States Patent [19]

Yang

[11] Patent Number: 5,259,088
[45] Date of Patent: Nov. 9, 1993

[54] TWIN CASTER WITH A BIASED SUSTAINING ELEMENT

[76] Inventor: Su-Hua Yang, 25, Lane 97, Hertzuoh Street, Fong-Yuan, Taichung Hsien, Taiwan

[21] Appl. No.: 29,611

[22] Filed: Mar. 11, 1993

[51] Int. Cl.⁵ .................. A47B 91/00; B60B 33/00
[52] U.S. Cl. .......................... 16/47; 16/44; 16/33
[58] Field of Search ............... 16/44, 47, 33

[56] References Cited

U.S. PATENT DOCUMENTS

| | | | |
|---|---|---|---|
| 2,537,296 | 1/1951 | Yeakel | 16/44 |
| 4,747,180 | 5/1988 | Screen | 16/33 |
| 4,807,328 | 2/1989 | Hezel | 16/47 |
| 4,821,369 | 4/1989 | Daniels | 16/44 |

FOREIGN PATENT DOCUMENTS 2485448  12/1981  France ........................ 16/44

*Primary Examiner*—John Sipos
*Assistant Examiner*—Carmine Cuda
*Attorney, Agent, or Firm*—Browdy and Neimark

[57] ABSTRACT

An improved chair caster comprises a main body, an upright tube, an elastic element, and a sustaining element. The chair remains stationary when no one sits on the chair, so as to enhance the safety of an office worker.

7 Claims, 5 Drawing Sheets

TWIN CASTER WITH A BIASED SUSTAINING ELEMENT

BACKGROUND OF THE INVENTION

The present invention relates to a caster, and more particularly to a freely rolling caster attached to each leg of a piece of furniture such as a computer chair, a sofa, a table, a bed, a Tv stand, and the like.

As shown in FIG. 1, the bottom corners of an office chair, such as a computer chair, are generally provided with five casters 11 so that it can be moved easily. Such casters 11 are defective in design in that they are free to roll even at such time when no one is sitting on the chair. As a result, the chair can be easily moved by someone who happens to touch it. Even the chair can move itself if it happens to be set on a slippery floor or an inclined floor. An office worker is vulnerable to an accident in which he or she might miss the chair when he or she returns to the seat without being aware of the fact that the chair has moved away from its original position.

SUMMARY OF THE INVENTION

It is therefore the primary objective of the present invention to provide an improved chair caster, which remains stationary when no one sits on the chair, so as to enhance the safety of an office worker.

The present invention may best be understood through the following description with reference to the accompanying drawings, in which:

DETAILED DESCRIPTION OF THE INVENTION

Figure 1:
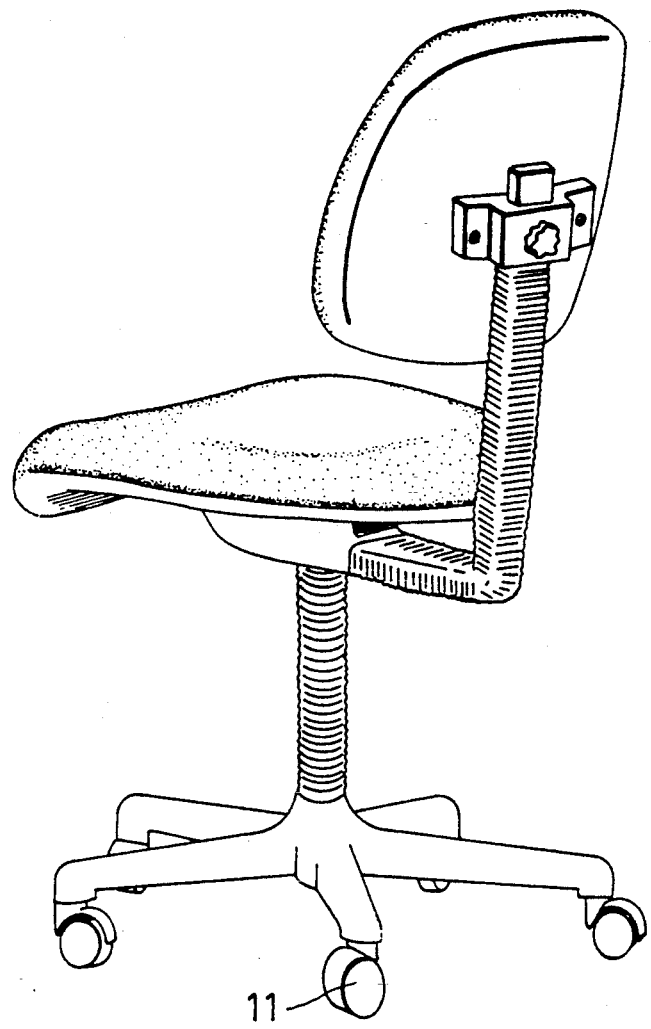
FIG. 1 shows a perspective view of a prior art computer chair.
Figure 2:
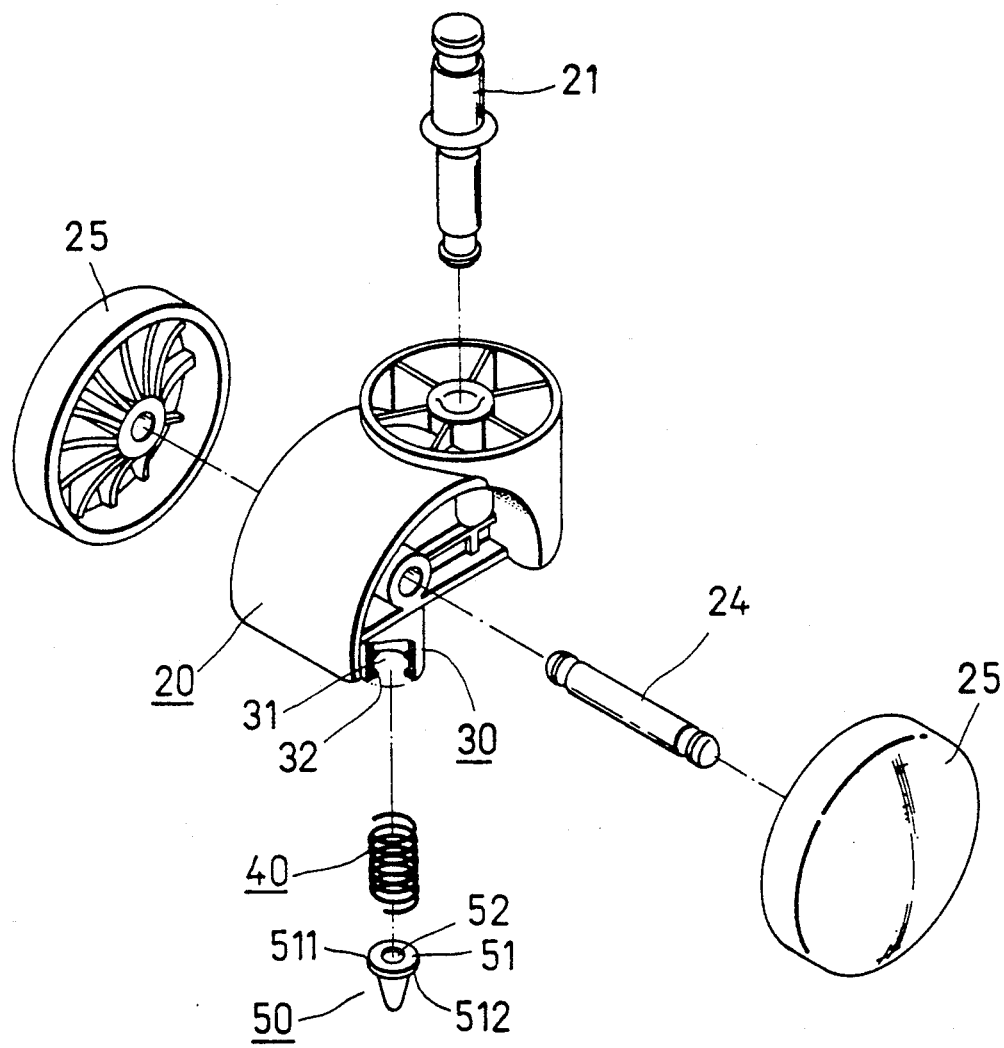
FIG. 2 shows an exploded view of the present invention.
Figure 3:
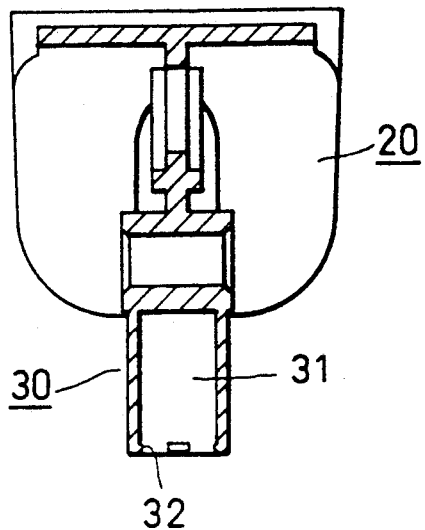
FIG. 3 shows a schematic view of the structures of a main body (20) and an upright tube (30) of the present invention.
Figure 4:
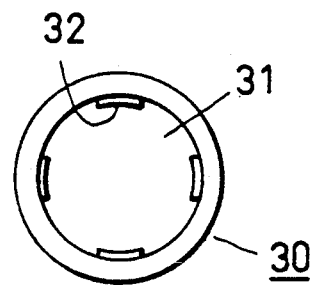
FIG. 4 shows a bottom view of the upright tube of the present invention.
Figure 5:
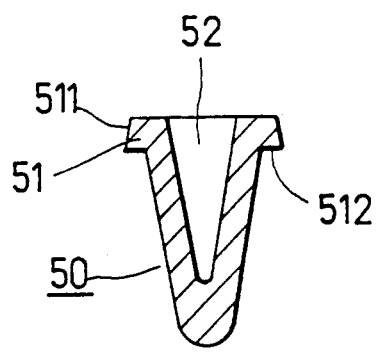
FIG. 5 shows a sectional view of a sustaining member (50) of the present invention.
Figure 6:
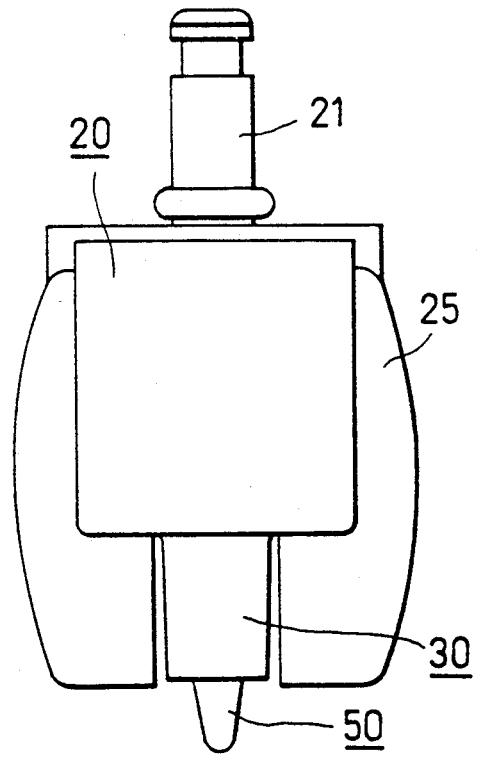
FIG. 6 shows a front elevational view of the present invention.
Figure 7:
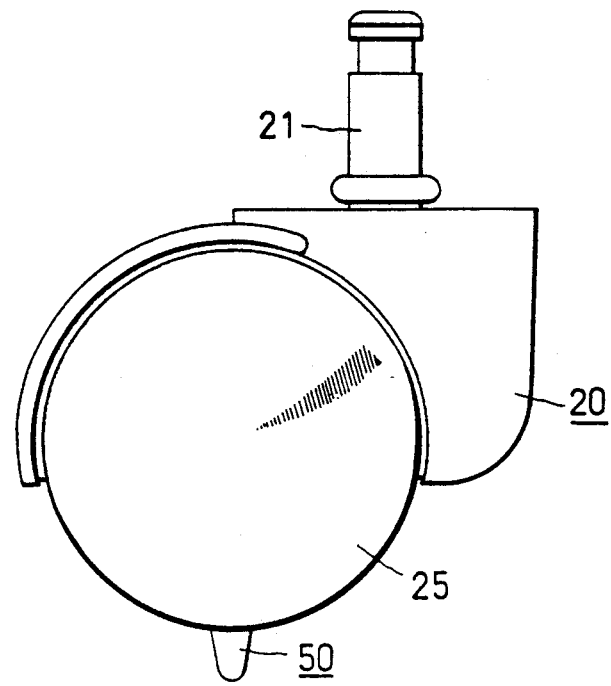
FIG. 7 shows a side elevational view of the present invention.
Figure 8:
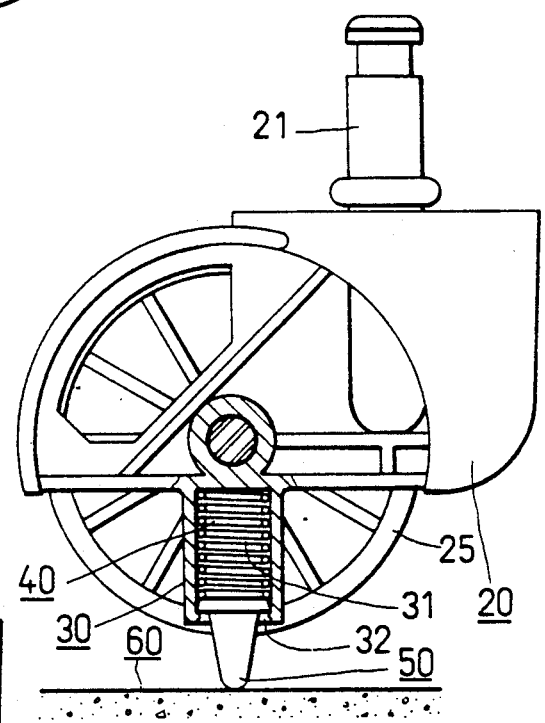
FIG. 8 shows a sectional view of the present invention without a person sitting thereon.

Referring to FIGS. 2-8, the present invention is shown to comprise a main body 20, an upright tube 30, an elastic element 40, and a sustaining element 50.

The main body 20 is made of plastic material by injection molding. The main body 20 is provided at one side thereof with a pivotal shaft 21 by which the main body 20 is pivoted to the underside of a clawlike base of a chair. The main body 20 has a bottom portion 22 of rectangular construction, which is provided at a position slightly over the center thereof with a shaft hole 23 for receiving therein a cross shaft 24 which is in turn provided respectively at both ends thereof with a caster 25 making contact with the floor.

The upright tube 30 has an upper end that is integrally connected with the center of the bottom portion 22 of the main body 20. The upright tube 30 has an open lower end provided with an inner hole 31 having on the wall thereof a plurality of equidistantly spaced arresting portions 32 of proturded arcuate construction.

The elastic element 40 is lodged in the inner hole 31 of the upright tube 30. In the preferred embodiment of the present invention, the elastic element 40 so used is a compression spring having excellent strength and elasticity.

The sustaining element 50 is made of a rigid impact-resistant plastic material. The sustaining element 50 has a bottom end of spherical construction and a top end provided thereon horizontally a protruded ring portion 51 having a tapered guide portion 52 which is so constructed that it becomes progressively wider toward its bottom. The sustaining element 50 is further provided from the top thereof toward the bottom thereof with an inverted conical portion 52. In combination, the top end of the sustaining element 50 is forced into the upright tube 30 by means of a machine. The tapered guide portion 52 of the sustaining element 50 facilitates the union of the sustaining element 50 and the upright tube 30. The sustaining element 50 is urged downwards by the elastic element 40 such that a bottom 512 of the protruded ring portion 51 of the sustaining element 50 is stopped at the top of the arresting portion 32 of the upright tube 30.

Figure 9:
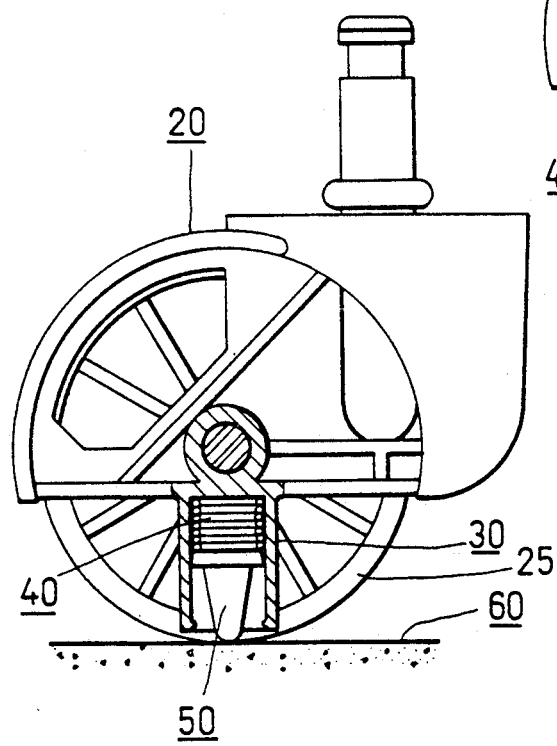
FIG. 9 shows moving conditions of the present invenion with some one sitting thereon.
Figure 10:
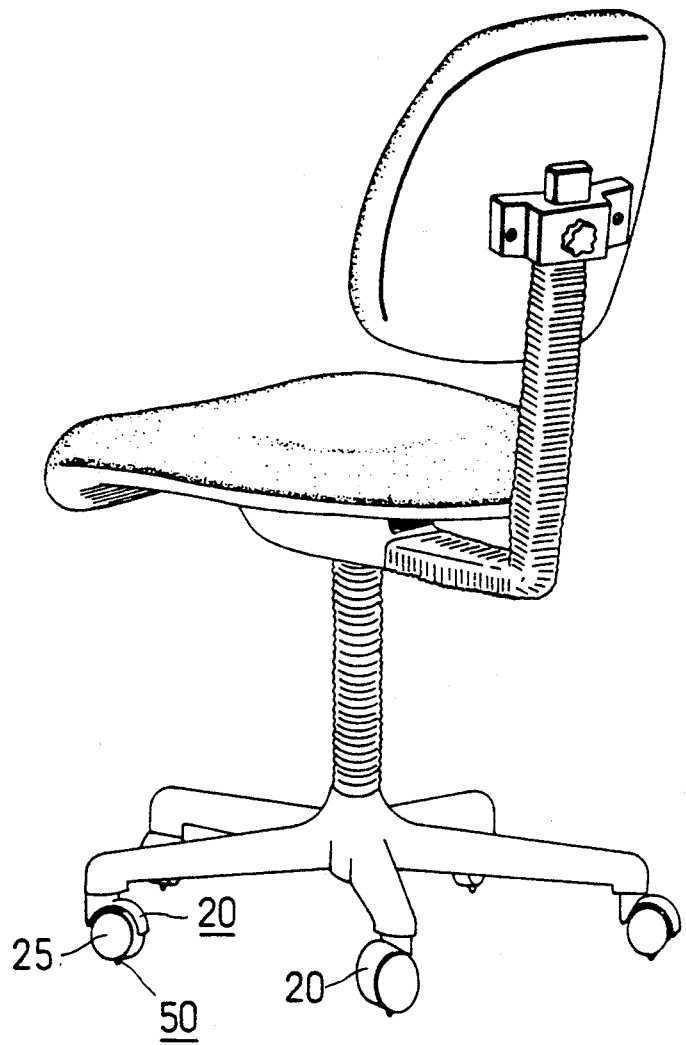
FIG. 10 shows moving conditions of a computer chair of the present invention without a person sitting thereon.

When a person sits on the chair, as shown in FIG. 10, the weight of the person overcomes the expansion force of the elastic element 40 so as to force the main body 20 and the upright tube 30 to descend. As a result, the elastic element 40 is so compressed that the caster 25 is caused to make contact with a floor 60, thereby making the chair movable on the floor 60. As soon as the person moves away from the chair, the sustaining element 50 is urged downwards by the expansion force of the elastic element 40 as indicated in FIG. 9. As a result, the chair is raised such that the caster 25 no longer makes contact with the floor 60. Therefore, the chair remains stationary.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. A twin caster of chair and the like comprising:
   a main body having a shaft pivoted to a side thereof for allowing said main body to be pivoted to an underside of a clawlike base of a chair, said main body having a bottom of planar construction provided with an axial hole to receive therein a cross shaft having two ends, to each of which a caster is pivoted in such a manner that a bottom of said caster makes contact with a floor; wherein said chair is characterized in that said chair further comprises:

an upright tube having an upper end connected to a predetermined protion of said bottom of said main body and having a lower end provided with an inner hole having lower segment of circumference thereof forming an arresting portion;

a sustaining element of rigid material having an upper end provided thereon horizontally a protruded ring portion which in turn is provided with a tapered guide portion in the outer circumference thereof for allowing said upper end of said sustaining element to be forced into said upright tube, and an elastic element lodged in said upright tube in such a manner that said elastic element urges downwards said sustaining element so as to cause a bottom of said protruded ring portion of said sustaining element to be stopped at a top of said arresting portion of said upright tube, and to cause a bottom of said sustaining element to urge said floor, thereby, causing said caster to make no contact with said floor.

2. The twin caster according to claim 1 wherein said elastic element is a compression spring.

3. The twin caster according to claim 1 wherein said arresting portion of said upright tube is of protruded arcuate construction.

4. The twin caster according to claim 1 wherein said sustaining element has a lower end of spherical construction.

5. The twin caster according to claim 1 wherein said sustaining element is made of a rigid impact-resistant plastic material.

6. The twin caster according to claim 1 wherein said upright tube has an upper end that is integrally coupled with said main body.

7. The twin caster according to claim 3 wherein said upright tube has four arresting poritons.

* * * * *